Feb. 17, 1931.　　　　G. TREMOLADA　　　　1,792,617
SCREW TYPE BRAKE OPERATING MECHANISM FOR DRAW WORKS
Filed June 1, 1929　　　4 Sheets-Sheet 1

INVENTOR:
GUGLIELMO TREMOLADA,
By
ATTORNEY.

Feb. 17, 1931.                  G. TREMOLADA                  1,792,617
              SCREW TYPE BRAKE OPERATING MECHANISM FOR DRAW WORKS
                         Filed June 1, 1929         4 Sheets-Sheet 4
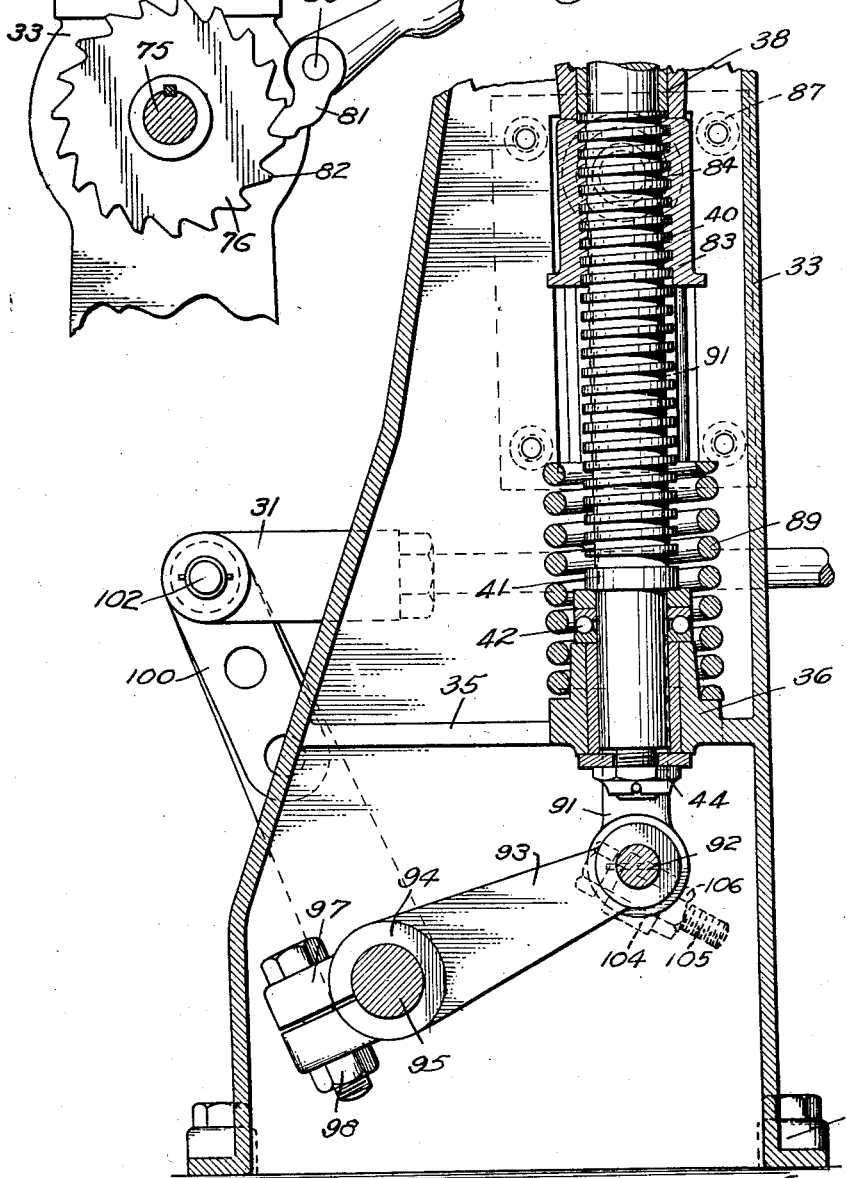

Patented Feb. 17, 1931

1,792,617

UNITED STATES PATENT OFFICE

GUGLIELMO TREMOLADA, OF LOS ANGELES, CALIFORNIA, ASSIGNOR TO EMSCO DERRICK & EQUIPMENT COMPANY, OF LOS ANGELES, CALIFORNIA, A CORPORATION OF CALIFORNIA

SCREW-TYPE BRAKE-OPERATING MECHANISM FOR DRAW WORKS

Application filed June 1, 1929. Serial No. 367,782.

My invention relates to draw-works such as are used in oil-well derricks and it relates to a novel brake-operating mechanism for draw-works.

The draw-works now generally used has a spooling drum on which a cable is wound and to which a brake drum is connected. Associated with the brake drum is a brake band for locking the brake drum from rotation. The band of the brake is connected to an operating lever which is manually operated. The brake is applied by a workman exerting a force on the lever and the brake is applied only so long as the lever is held in braking position.

An object of my invention is to provide a brake-operating mechanism which may be either manually or mechanically operated to apply the brake to any degree of braking pressure.

In the preferred form of my invention the brake is associated with a screw, which screw may be rotated (manually or mechanically) to apply the brake as desired.

A further object of my invention is to provide brake-operating mechanism which may be operated to hold the brake in any desired operating position.

This object of my invention is accomplished by providing gear means for operating other parts of the mechanism. The gear means will occupy any position it is given, until further operated. The brake may therefore be set to lock the drum or to permit it to rotate at the desired speed.

Other objects inhering in the details of construction of my invention will be made evident in the following description.

Referring to the drawings:

Fig. 4 is a section taken on the line 4—4 of Fig. 3.

Fig. 5 is a section taken on the line 5—5 of Fig. 3.

Fig. 6 is a section taken on the line 6—6 of Fig. 3.

Fig. 7 is a section taken on the line 7—7 of Fig. 3.

Figure 1:
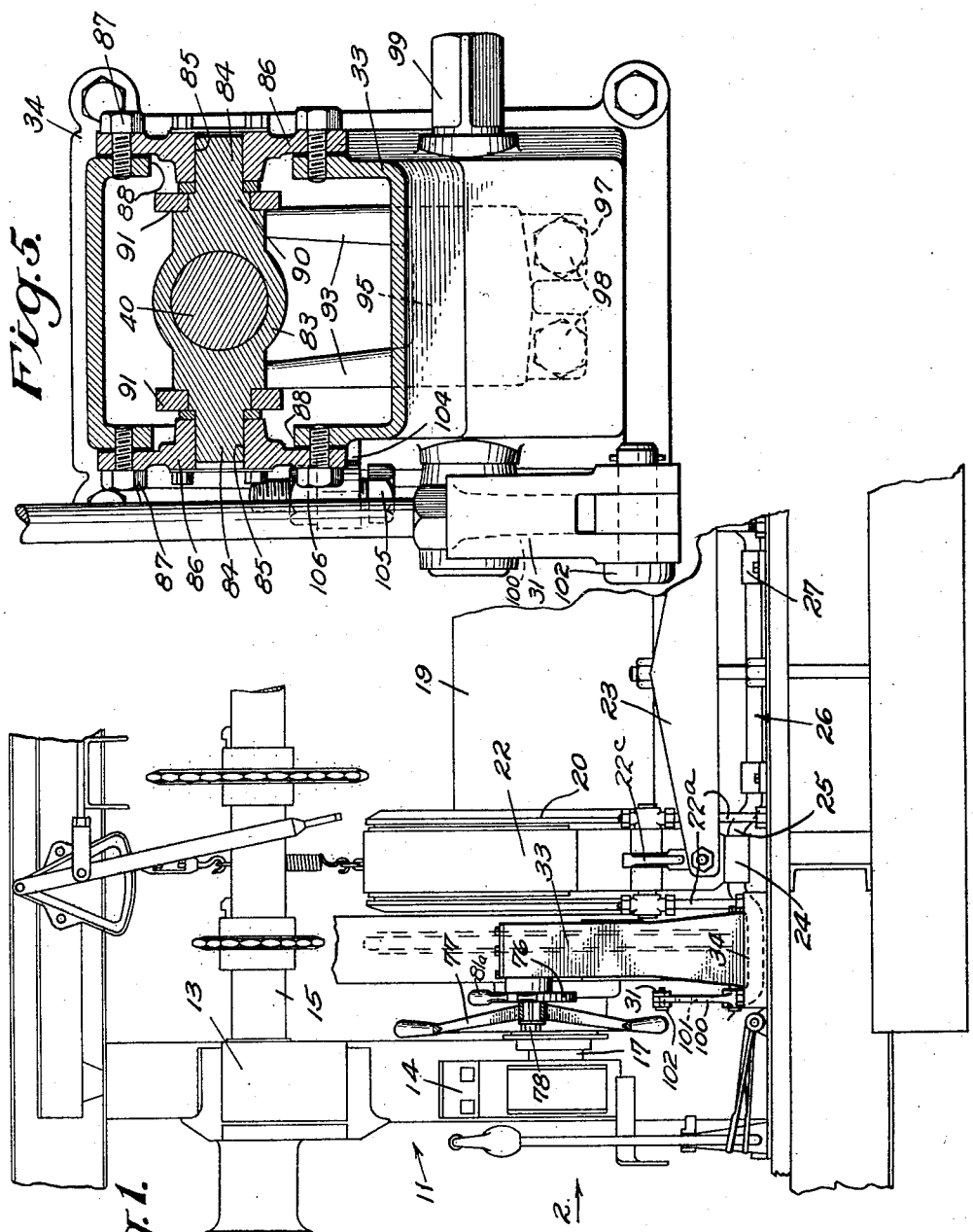
Fig. 1 is a front fragmentary elevational view showing a portion of the draw-works with my invention applied thereto.
Figure 2:
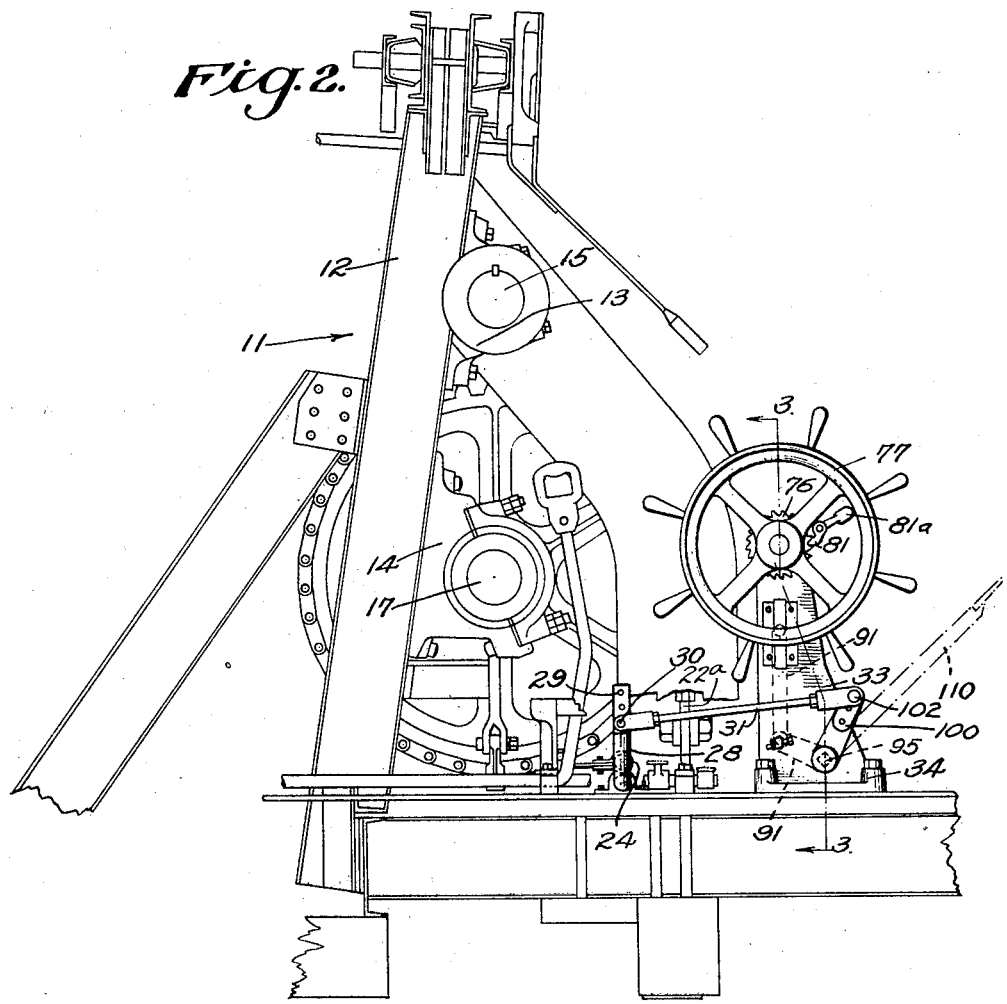
Fig. 2 is a view taken as indicated by the arrow 2 of Fig. 1.

Referring to the drawings in detail and particularly to Figs. 1 and 2, I represent a draw-works 11 having uprights 12 which support bearings 13 and 14, the bearings 13 carrying a line shaft 15 and the bearings 14 carrying a drum shaft 17. Rotatably supported on the drum shaft 17 is a spooling drum 19 having a brake drum 20 attached thereto. The spooling drum may be non-rotatably attached to the drum shaft by operating certain clutch mechanism which is ordinarily provided in draw-works of this character. In view of the fact that such construction does not form a part of this invention the details thereof will not be explained. Anyone versed in the art is well acquainted with such construction.

Adapted to engage the brake drum 20 is a brake band 22, one end of which is anchored to the draw-works base, preferably by upright bolts 22ª, and is in the usual manner connected to an adjustment yoke 23 by a link 22ᶜ. The other end of the brake band 22 is provided with a bearing member 24 which surrounds a crank portion 25 of an operating bar 26. The operating bar 26 is rotatably supported by bearings 27 attached to the floor of the derrick. One end of the operating bar 26 is provided in the form of a lever 28, the upper free end of which has a plurality of holes 29 in one of which is positioned a pin 30 for pivotally connecting a link 31 to the lever 28, the link 31 extending to the brake operating mechanism of my invention.

Referring now to Figs. 3 to 7 inclusive, I will describe in detail the construction and operation of my invention. The numeral 33 represents a housing which has a base 34 adapted to rest on the floor of a derrick. Near the lower end of the housing 33 is a web 35 which carries a bearing 36. Near the upper end of the housing 33 is a web 37 which carries a bearing 38. Adapted to be rotatably supported by these bearings 36 and 38 is a vertical screw 40. The screw 40 has a shoulder 41 and disposed between the shoulder 41 and the upper end of the bearing 36 is a thrust bearing 42 adapted to take the weight of the screw 40. Longitudinal movement of the screw 40 is prevented by means of a nut and washer means 44 attached to the lower end of the screw 40 below the bearing 36.

The upper end of the housing 33 is provided with a ring portion 45, which provides a cylindrical opening 46 in which is disposed a bearing 50. Opposite the opening 46 in the housing 33 is a large opening 51 adapted to receive a bearing retainer 52 which has a pocket 53 that receives a bearing 54. The bearing 54 is retained in the pocket 53 by a cover plate 56. The bearings 54 and 50 are adapted to rotatably support a stub shaft 59 having a cylindrical portion 60 to which is secured a large bevel gear 61 adapted to mesh with a small bevel gear 62 secured to an upper tapered end 63 of the screw 40 by means of a nut 64.

The bevel gear 61 is held in place by a washer or plate 66 adapted to engage a shoulder 67 formed at the end of the cylindrical portion 60. A cylindrical portion 68 of the stub shaft 59 adjacent the cylindrical portion 60 is of smaller diameter and receives the bearing 50 and a spacing sleeve 69, which sleeve 69 engages the plate 66 and the bearing 50. The parts just described are clamped onto the stub shaft 59 by means of a nut 70 which is screwed onto a threaded end 71 of the stub shaft 59 and rests in a pocket 72 provided by the housing adjacent the ring portion 45, which pocket 72 is covered by a removable plate 73.

The stub shaft 59 has a shoulder 74 formed on it on the left side of the bearing 54, which shoulder is adapted to engage the bearing 54. Placed on a cylindrical portion 75 of the stub shaft 59 on the left of the shoulder 74 is a ratchet wheel 76, and outside a ratchet wheel 76 is an operating means in the form of a hand wheel 77. The ratchet wheel 76 and the hand wheel 77 are secured in place by means of a nut 78 threaded on a threaded projection 79 of the stub shaft 59. If desired, the hand wheel 77 may be replaced by a gear so that the mechanism may be operated by a motor or other mechanical power.

As best shown in Fig. 7 a pin 80 secured to the outside of the housing 33 pivotally supports a dog 81 adapted to engage teeth 82 on the ratchet wheel 76. The dog 81 is provided with an operating handle 81a disposed so that the weight thereof may be caused to maintain the dog 81 in contact with the teeth 82.

Placed on the screw 40 is a traveling member in the form of a nut 83 which has trunnions 84 extending from the opposite sides thereof. As shown best in Fig. 5, the trunnions 84 extend into vertical guide openings 85 of guide members 86. The guide members 86 are secured by cap screws 87 to side walls of the housing 33 and a portion of the guide members 86 is adapted to extend through side openings 88 of the housing. The guide members 86 permit the nut 83 to move vertically but prevent rotation thereof.

Surrounding the lower part of the screw 40 and resting on the bearing 36 is a cushioning means in the form of a coil spring 89. The coil spring 89 is engaged by the nut 83 slightly before the nut 83 reaches its lowest position, and the effect of the coil spring is to cushion the nut and gradually decrease its downward motion. This is to prevent jamming of the parts and to relieve the mechanism of jars.

Formed at the inner ends of the trunnions 84 are bearings 90 which are engaged by the upper ends of links 91. As shown best in Figs. 3 and 4 the links 91 extend downward inside the housing 33 and the lower ends thereof pivotally support a horizontal pin 92 which carries a pair of arms 93. The arms 93 extend from a split hub 94 carried by a cross shaft 95 which is journalled by bearings 96, which bearings 96 form a part of the housing 33. The split hub 94 is provided with lugs 97 through which bolts 98 extend for clamping the hub immovably on the shaft 95.

Figure 3:
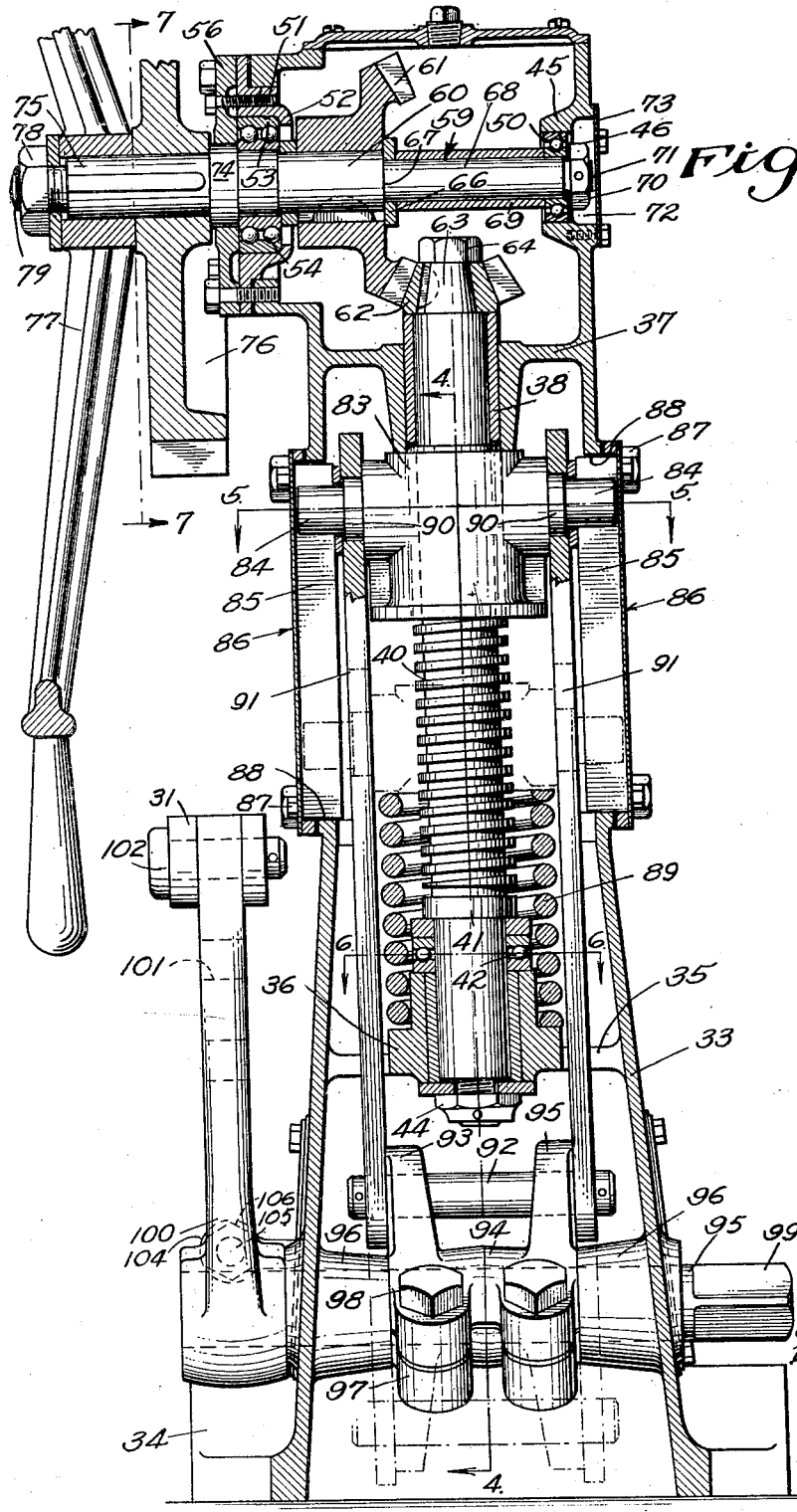
Fig. 3 is an enlarged elevational section of my invention taken substantially on the line 3—3 of Fig. 2.

The right end of the shaft 95, as shown in Fig. 3, is provided with a squared end 99 for the application of an emergency lever so that the cross shaft 95 may be manually operated, if desired. Rigidly secured on the left end of the shaft 95, as shown in Fig. 3, is a lever 100. The upper end of the lever 100 carries a plurality of holes 101, in one of which is a pin 102 which pivotally connects the link 31 to the lever 100.

The housing 33 is provided with a projection 104 which extends outward so as to intersect the plane of rotation of the lever 100 and is provided with an adjustable stop in the form of a bolt 105 threadedly inserted into the projection 104. The bolt 105 is provided with a lock nut 106 and is positioned so as to engage the lever 100 when the lever 100 is in the released position.

The operation of my device is intended to effect the applying or releasing of the brake band 22, as desired. One feature of the construction is that the mechanism may be operated to retain the band in position without requiring the operator to be present and to hold the parts in this position. Another feature of the mechanism is that the brake band may be set so that any degree of braking pressure may be applied.

By rotating the hand wheel 77 the stub shaft 59 and the gears 61 and 62 will cause the screw 40 to rotate. When rotated in one direction the screw 40 will cause the nut 83 to rise and when rotated in another direction the screw 40 will cause the nut 83 to depress.

When the nut 83 is moved upward the links 91 lift upward on the arms 93 and the shaft 95 is rotated to move the lever 100 in a counter-clockwise direction. This will cause the link 31 to move the operating bar so that the cranks 25 thereof will apply the brake band 22 to the brake drum 20.

To release the brake band the hand wheel 77 is rotated in an opposite direction so that the nut 83 is moved downward by the screw 40. It will be seen that since the force applied to the parts facilitates a downward movement of the nut 83 it may be possible for the hand wheel 77 to be virtually spun, with the result that the lever 100, if provisions were not made to prevent it, would rotate and forcibly engage the adjustable stop or bolt 105. However, before the lever reaches this position the nut 83 engages the cushioning spring 89 and its downward movement is gradually decelerated and is stopped before the bolt 105 is engaged by the lever.

In the event that it is not desired to use the mechanism or in case of an emergency, the pin 92 is removed. The operator may then apply a lever such as indicated by dotted lines 110 to the square end 99 of the shaft 95, and the brake may be manually operated.

The pitch of the threads on the screw 40 is made such that the nut 83 will not overhaul. In normal operation, it is, therefore, not necessary to engage the dog 81 with the teeth 82 on the ratchet wheel 76 to prevent a releasing rotation of the hand wheel 77. The handle 81a is therefore turned to disengage the dog 81 from the teeth 82. In case the apparatus is not to be operated for some time and the brake might be accidentally released, the dog 81 is engaged with the teeth 82 so as to prevent a releasing rotation of the screw 40.

It is obviously possible to attach the emergency lever 110 at a point so as to turn the screw 40 by gear means in order to secure the mechanical advantage of the screw 40, without departing from the spirit of my invention.

The holes 29 and 101 in the levers 28 and 100 provide a means for adjusting the leverage so as to meet various operating conditions.

I claim as my invention:

1. In a draw-works, the combination of: a spooling drum having a brake element associated therewith; braking means adapted to engage said brake element; an operating means including a threaded screw and a nut on said screw; gear means for rotating said screw; guide means for said nut; a link attached to said nut; motion-transmitting means operatively connecting said link with said braking means; and cushioning means for cushioning the downward movement of said nut near the end of its travel.

2. In a draw-works, the combination of: a spooling drum having a brake element associated therewith; braking means adapted to engage said brake element; a supporting means; a vertical screw rotatably supported thereby; operating means for rotating said screw; a nut on said screw; guide means for said nut, said guide means being removably secured to said supporting means; a link connected to said nut and depending therefrom; a cross shaft rotatably supported by said supporting means below said nut; an arm secured to said shaft and connected to said link; a lever attached to said shaft; and motion-transmitting means operatively connecting said lever with said braking means.

3. In a draw-works, the combination of: a spooling drum having a brake element associated therewith; braking means adapted to engage said brake element; a supporting means; a vertical screw rotatably supported thereby; operating means for rotating said screw; a nut on said screw; guide means for said nut, said guide means being removably secured to said supporting means; a cushioning means for cushioning the movement of the nut in one direction; a link connected to said nut and depending therefrom; a cross shaft rotatably supported by said supporting means below said nut; an arm secured to said shaft and connected to said link; a lever attached to said shaft; and motion-transmitting means operatively connecting said lever with said braking means.

4. In a draw-works, the combination of: a spooling drum having a brake element associated therewith; braking means adapted to engage said brake element; a supporting means; a vertical screw rotatably supported thereby; a stub shaft above said screw, said stub shaft being rotatably supported by said supporting means; gears for connecting said stub shaft and said screw; means for turning said stub shaft; a nut on said screw; guide means for said nut, said guide means being removably secured to said supporting means; a link connected to said nut and depending therefrom; a cross shaft rotatably supported by said supporting means below said nut; an arm secured to said shaft and connected to said link; a lever attached to said shaft; and motion-transmitting means operatively connecting said lever with said braking means.

5. In a draw-works, the combination of: a spooling drum having a brake element associated therewith; braking means adapted to engage said brake element; an operating means including a threaded screw and a nut on said screw; gear means for rotating said screw; means preventing a releasing rotation of said screw; guide means for said nut; a link attached to said nut; and motion-transmitting means operatively connecting said link with said braking means.

6. In a draw-works, the combination of: a spooling drum having a brake element associated therewith; braking means adapted to engage said brake element; an operating means including a rotatable screw and a nut on said screw; guide means preventing rotation of said nut so that said nut will be translated axially upon rotation of said screw; and motion-transmitting means connecting said nut with said braking means.

7. In a draw-works, the combination of: a spooling drum having a brake element associated therewith; braking means adapted to engage said brake element; an operating means including a rotatable screw and a nut on said screw; guide means preventing rotation of said nut so that said nut will be translated axially upon rotation of said screw; cushioning means engageable by said nut near the end of its travel; and motion-transmitting means connecting said nut with said braking means.

8. In a draw-works, the combination of: a spooling drum having a brake element associated therewith; braking means adapted to engage said element; an operating means including a rotatable drive screw and a nut on said screw; means preventing rotation of said nut but permitting axial travel thereof when said screw is rotated; and means operatively connecting said nut and said braking means to operate said braking means upon axial travel of said nut, the threads of said screw and said nut being of such pitch as to automatically maintain said nut in any position of adjustment.

In testimony whereof, I have hereunto set my hand at Los Angeles, California, this 22 day of May, 1929.

GUGLIELMO TREMOLADA.